(12) United States Patent
Wennerström

(10) Patent No.: US 7,323,104 B2
(45) Date of Patent: Jan. 29, 2008

(54) WATER FILTERING DEVICE

(75) Inventor: Johan Wennerström, Sollentuna (SE)

(73) Assignee: Blue Air AB, Stockholm (SE)

( * ) Notice: Subject to any disclaimer, the term of this patent is extended or adjusted under 35 U.S.C. 154(b) by 0 days.

(21) Appl. No.: 10/562,695

(22) PCT Filed: Jun. 29, 2004

(86) PCT No.: PCT/SE2004/001043

§ 371 (c)(1),
(2), (4) Date: Dec. 27, 2005

(87) PCT Pub. No.: WO2005/002706

PCT Pub. Date: Jan. 13, 2005

(65) Prior Publication Data
US 2006/0151381 A1    Jul. 13, 2006

(30) Foreign Application Priority Data
Jul. 1, 2003 (SE) .................................. 0301937

(51) Int. Cl.
*B01D 33/01* (2006.01)
*B01D 36/02* (2006.01)

(52) U.S. Cl. .................. 210/266; 210/282; 210/285; 210/359; 210/416.3

(58) Field of Classification Search ............... 210/266, 210/282, 285, 359, 416.1, 416.3
See application file for complete search history.

(56) References Cited

U.S. PATENT DOCUMENTS

| | | | | |
|---|---|---|---|---|
| 175,508 | A * | 3/1876 | Schieffelin | 210/115 |
| 2,566,371 | A * | 9/1951 | Quinn | 210/232 |
| 3,174,623 | A * | 3/1965 | Sloan | 210/285 |
| 4,749,481 | A * | 6/1988 | Wheatley | 210/282 |
| 6,197,193 | B1 * | 3/2001 | Archer | 210/266 |

FOREIGN PATENT DOCUMENTS

| | | |
|---|---|---|
| DE | 2315615 | 10/1974 |
| EP | 1270514 | 1/2003 |
| WO | WO 9110493 | 7/1991 |
| WO | WO 0057985 | 10/2000 |
| WO | WO 0172643 | 10/2001 |

* cited by examiner

*Primary Examiner*—Fred G. Prince
(74) *Attorney, Agent, or Firm*—Young & Thompson

(57) ABSTRACT

A water filter device includes a container (1) that has an opening for filling of water, and a filter unit (3) that is movable relative to the container (1). It is significant of the device that the filter unit (3) includes a filter element (5), an operating rod (7) connected to the filter element (5) and sealing means (14) along the periphery of the filter element (5), and that the filter element (5) has a particle filter (10) and an adsorption filter (11).

7 Claims, 3 Drawing Sheets

WATER FILTERING DEVICE

TECHNICAL FIELD OF THE INVENTION

The present invention relates to a water filter device, said device comprising a container that has an opening for filling of water, and a filter unit that is movable relative to the container, that the filter unit comprises a filter element, an operating rod connected to the filter element and sealing means along the periphery of the filter element, and that the filter element comprises a particle filter and an adsorption filter.

PRIOR ART

From WO 00/57985 a filter device is previously known that comprises a container, a filter means in the shape of a piston-like cartridge that has a shape adapted to the inner shape of the container. The filter device also comprises a rod that is connected to the filter means. Manually, via the rod, the filter means may be displaced relative to the container. When the filter means is displaced downwards through a water volume in the container a filtering of the water takes place. The filter means may container different types of filter media. Above the filter means there is a protection device for the water, said protection device being attached to the rod and is in the shape of a disc that floats on the water surface. The protection device comprises an anti-bacterial medium that for instance may constitute a two-dimensional fine silver mesh.

OBJECTS AND FEATURES OF THE INVENTION

A primary object of the present invention is to present a water filter device of the type defined above that generally brings about an improved water quality.

A further object of the present invention is to improve both the anti-bacterial function and the mechanical purification of the device.

Still an object of the present invention is a structural simplicity and simultaneously extreme user-friendliness.

BRIEF DESCRIPTION OF THE DRAWINGS

Below embodiments of the invention will be described, reference being made to the accompanying drawings, where.

DETAILED DESCRIPTION OF PREFERRED EMBODIMENTS OF THE INVENTION

Figure 1:
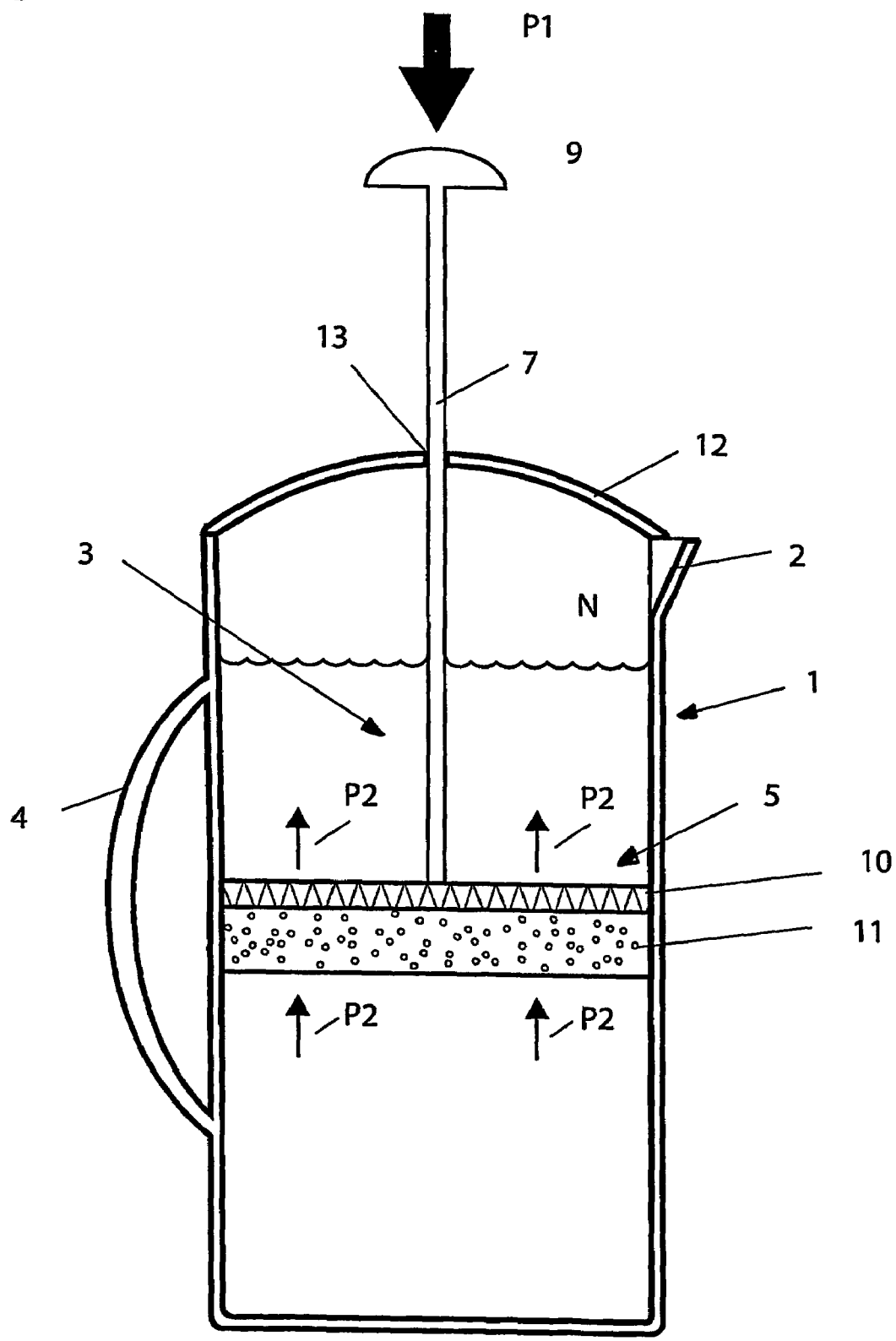
FIG. 1 shows a schematic side view of a water filter device according to the present invention.

The water filter device shown in FIG. 1 comprises the container 1, preferably in the shape of a jug of glass that has an upper open end for filling of water to be filtered. The container 1 is also equipped with a spout 2 and a handle 4 in order to facilitate the pouring of water from the container 1. The device according to the present invention also comprises a filter unit 3 that in its turn comprises a generally disc shaped filter element 5 and an operating rod 7 connected to the filter element 5. The operating rod 7 has an extension perpendicular to the plane that is occupied by the filter element 5. In connection with displacement of the operating rod 7 the filter element 5 is displaced relative to the container 1. At the end facing away from the filter element 5 the operating rod 7 is equipped with a knob 9.

The operating rod 7 is preferably coated with an agent that emits silver ions and it is known that the silver ions in the water have an anti-bacterial effect upon the water. By having the agent that emits silver irons attached to the operating rod 7 there is no need for a separate element or means to take care of the emitting of silver ions in the water.

In the shown embodiment the filter element 5 comprises a particle filter 10 and an adsorption filter 11, said filters 10, 11 being arranged in close proximity to each other in axial direction of the filter unit 3. According to the shown embodiment the adsorption filter 11 is arranged furthest away from the operating rod 7.

The filter unit 3 also comprises a lid 12 that fits in the open end of the container 1. The lid 12 is equipped with a hole 13, in which the operating rod 7 is received and displaceable relative to the lid 12.

The particle filter 10 may for instance have polypropylene as filter medium and this medium should have the ability to filter out particles down to a size of 0.2 μm.

The adsorption filter 11 is normally a carbon filter that has activated carbon as filter medium. The carbon filter adsorbs in conventional way gases that creates smell, taste or being poisonous, e.g. chlorine.

Figure 2:
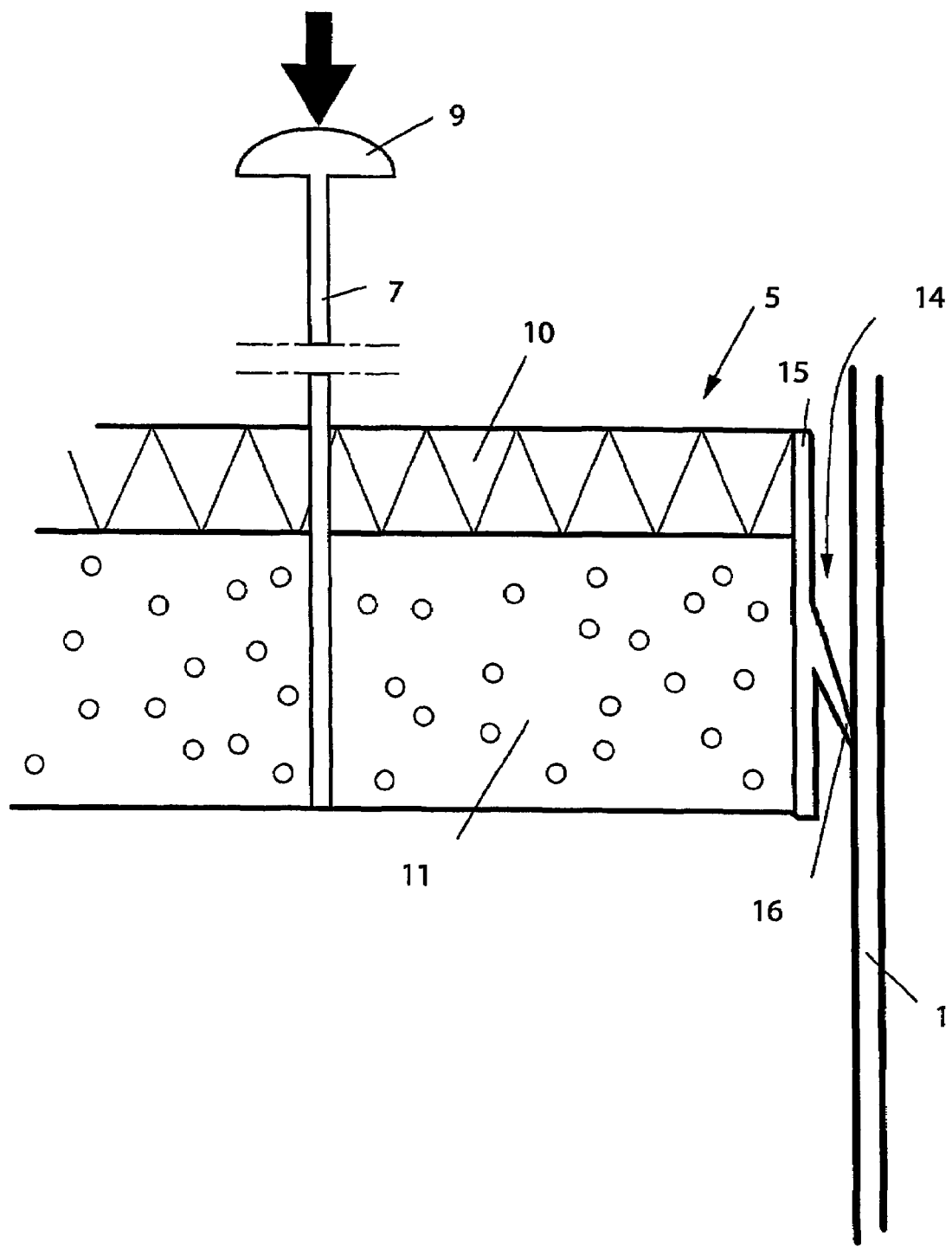
FIG. 2 shows a detail in enlarged scale of the attachment of the filter unit to the container.

In FIG. 2 it is shown in larger scale an example of how a sealing 14 between the filter element 5 and the inner side of the container 1 may be designed. The sealing 14 comprises an annular base element 15 that is attached to the periphery of the filter element 5 and a tongue 16 that projects from the base element 15, the free end of the tongue 16 being in contact with the inner side of the container 1. The tongue 16 has also a tangential extension along the entire periphery of the filter element 5. The base element 15 and the tongue 16 are preferably integral with each other and made out of the same material that for instance may constitute a plastic of suitable flexibility.

The device according to the present invention that has been described above functions in the following way. The water to be purified is poured into the container 1 via the open upper end, the lid 12 being removed. When the liquid has reached the desired level N the lid is again placed in position according to FIG. 1, however the filter element 5 in this phase being located above the water surface N of the water that is to be filtered. Then the operator brings the operating rod 7 to be displaced downwards in direction of the arrow P1, the knob 9 suitably being in contact with the palm of the operator. The operator effects the displacement of the operating rod 7 in direction of the arrow P1 by pushing the hand that receives the knob 9 downwards. In connection therewith the filter element 5 breaks through the water surface N and continues downwards through the water that is to the filtered. The water that is forced through the filter element 5 is symbolised by the arrows P2. In this connection it should be pointed out that it is extremely important that in principle all of the water in the container is forced to pass through the filter element 5. In order to achieve this the sealing 14 between the periphery of the filter element 5 and the inner side of the container 1 must be extremely efficient as regards its function, i.e. water must not pass between the periphery of the filter element 5 and the inner side of the container 1. By giving the tongue 16 an extension in an inclined direction downwards it will be guaranteed to a high degree that water is not bypassing the tongue 16 when the filter element 5 is displaced downwards in FIG. 2.

The water, see the arrows P2, that is brought to pass through the filter element 5 will initially be subjected to a purification by means of adsorption via the carbon filter 11 and then a purification from particles via the particle filter 10. This means that apart from purification from particles also a possible unpleasant smell or taste of the water will be eliminated. The reason that the carbon filter 11 is located below the particle filter 10 is that the particle filter 10 will adhere possible particles that loosen from the carbon filter 11.

In principle all water in the container 1 has passed through the filter element 5 when the filter element 5, via the operating rod 7, has been displaced that far downwards that the filter element 5 has entered into contact with the bottom of the container 1. The filtered water, that is located above the filter element 5, is now ready for drinking and may be poured into a glass or the like via the spout 2.

Figure 3:
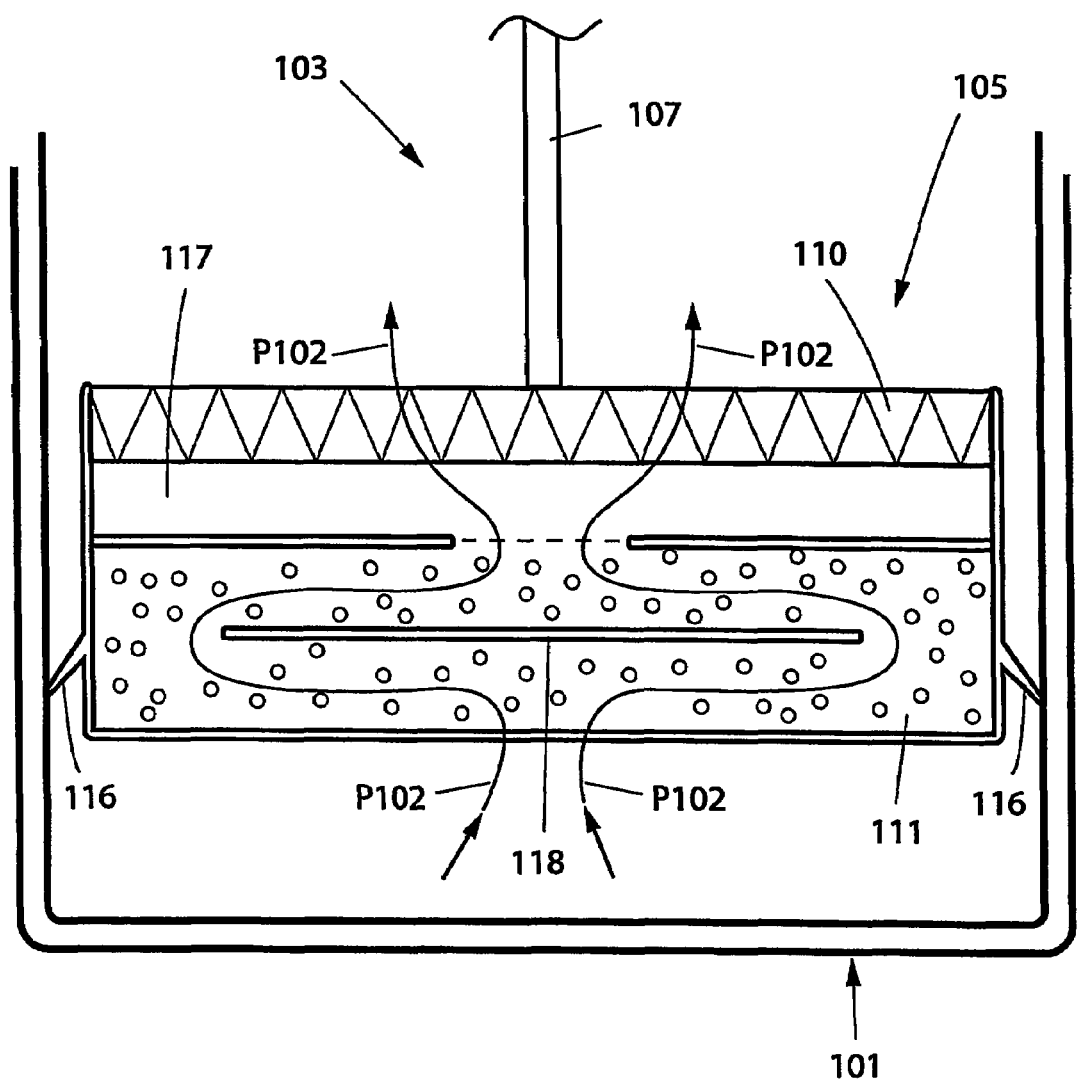
FIG. 3 shows schematically an alternative embodiment of the filter unit.

In FIG. 3 it is schematically shown an alternative embodiment of a filter element 105 that in the disclosed embodiment comprises a particle filter 110 and an adsorption filter 111, said filters 110 and 111 being arranged one after the other in axial direction of the filter element 105. Between the particle filter 110 and the adsorption filter 111 a spreading chamber 117 is provided. According to the shown embodiment the adsorption filter 111 is arranged furthest away from an operating rod 107 that is attached to the filter element 105. In a corresponding way as for the embodiment described above the operating rod 107 is preferably coated with an agent that emits silver ions.

The filter element 105 has also a labyrinth function for the water that flows through the filter element 105. Thus, a partition 118 is provided in the adsorption filter 111, said partition 118 generally having an extension transverse to the longitudinal direction of the operating rod 107. Preferably, the partition 118 is in the shape of a circular disc having a diameter that is a smaller than the diameter of the filter element 105. Preferably, the diameter of the partition/disc constitutes 50-80% of the diameter of the filter element 105. When the filter element 105 is displaced downwards in the container 101 the water is forced to bypass the filter element 105. In connection therewith the lines P102, having arrows, symbolise the flow path for the water through the filter element 105. As is evident from FIG. 3 the water must make a "detour" around the partition 118 and consequently the flow path for the water through the adsorption filter 111 is prolonged compared to the embodiment according to FIG. 1. The prolonged flow path brings about that the time of contact between the water and the adsorption filter is increased. This brings about a generally higher degree of separation of pollution solved in the water.

FEASIBLE MODIFICATIONS OF THE INVENTION

In the description of the embodiments above it is stated that the operating rod 7; 107 preferably is coated with an agent that emits silver ions. As an alternative to this design it is feasible within the scope of the present invention that the device comprises a separate element that emits silver ions, said element preferably being helical and having an extension along the operating rod 7; 107. By having the element helical a larger contact surface relative the water is achieved compared to having only the operating rod 7; 107 coated with an agent that emits silver ions.

In the description of the embodiments above it is stated that the filter material in the particle filter 10; 110 may constitute polypropylene. However, within the scope of the present invention alternative filter materials are feasible in the particle filter. In exemplifying and non-restricting purpose ceramic materials may be mentioned.

The filter element 5; 105 in the embodiments described above comprises a particle filter 10; 110 and a carbon filter 11; 111. However, within the scope of the present invention it is feasible that the filter element 5; 105 is equipped with further means, e.g. an ion exchanger and/or an oxidizing filter.

The invention claimed is:

1. Water filter device, said device comprising a container (1; 101) that has an opening for filling of water, and a filter unit (3; 103) that is movable relative to the container (1; 101), the filter unit (3; 103) comprising a filter element (5; 105), an operating rod (7; 107) connected to the filter element (5; 105) and sealing means (14; 116) along the periphery of the filter element (5; 105), the filter element (5; 105) comprising a particle filter (10; 110) and an adsorption filter (11; 111), the operating rod (7; 107) being coated with an agent that emits silver ions.

2. Device according to claim 1, characterized in that the filter element (5; 105) generally is disc shaped, and that the operating rod (7; 107) generally extends perpendicular to the filter element (5; 105).

3. Device according to claim 1, characterized in that the filter material in the particle filter (10; 110) constitutes polypropylene.

4. Device according to claim 1, characterized in that the filter material in the adsorption filter (11; 111) constitutes active carbon.

5. Device according to claim 1, characterized in that a partition (118) is provided in the adsorption filter (111), said partition (118) extending transverse to the longitudinal direction of the operating rod (107).

6. Device according to claim 5, characterized in that the partition is in the shape of a circular disc (118) with a smaller diameter than the filter element (105)

7. Device according to claim 1, characterized in that the sealing means (14; 114) comprises a tongue (16; 116), whose free end in active position abuts the inner side of the container (1; 101).

* * * * *